Patented Nov. 26, 1946

2,411,670

UNITED STATES PATENT OFFICE 2,411,670

HALOGEN-8-HYDROXY-QUINALDINES

Emil Senn, Riehen, near Basel, Switzerland, assignor to J. R. Geigy A. G., Basel, Switzerland No Drawing. Application April 6, 1943, Serial No. 482,066. In Switzerland June 4, 1942

4 Claims. (Cl. 260—289)

1

8-hydroxyquinolines halogenated in the hydroxylated nucleus possess generally a strong bactericide effect, especially against staphylococci and streptococci. Therefore, these substances are used as odorless powders for wounds in the antiseptical treatment of wounds. The best known compound of this group of antiseptics for wounds may be the iodo-chloro-8-hydroxy-quinoline.

It has now been found that halogenated derivatives of the 8-hydroxy-quinaldine possess surprising stronger bactericide properties than the corresponding derivatives of the 8-hydroxy-quinoline. Especially the 5:7-dichloro-8-hydroxyquinaldine shows a considerably stronger bactericide effect than the known iodo-chloro-8-hydroxy-quinoline.

The said compounds are obtained by usual halogenation of 8-hydroxy-quinaldine, preferably in suitable solvents like acetic acid, formic acid and so on.

The present invention is illustrated, but not limited by the following examples, wherein the parts are by weight.

Example 1

11.1 parts of 8-hydroxy-quinaldine are dissolved in 140 parts of formic acid. Chlorine is introduced into this solution under cooling, until the increase in weight corresponds to the required quantity of chlorine and a test of the chlorination mixture gives no more dyestuff formation with diazo-benzene in an acetic acid solution.

When the chlorination is complete, the reaction mixture is poured into 1000 parts of water and treated with a dilute sodium bisulfite solution, until no more reaction may be observed with starch-potassium iodide paper. Thereby the 5:7-dichloro-8-hydroxy-quinaldine separates out in form of a weakly yellowish colored precipitate. The same is filtered off and thoroughly washed with water.

After drying, 15 parts of 5:7-dichloro-8-hydroxy-quinaldine melting at 111°-112° C. are obtained. When recrystallised from alcohol, the product is obtained in voluminous, slightly yellowish needles having the melting point of 111.5°-112° C.

According to the same method brominated or less chlorinated 8-hydroxy-quinaldine derivatives may be produced.

Example 2

80 parts of 8-hydroxy-quinaldine are dissolved in 500 parts of 85% formic acid, whereupon, at temperatures of 0° to —10° C., 240 parts of bromine are allowed to drop into this solution within 3 to 4 hours, until a test gives no more dyestuff formation with o-chloro-diazo-benzene. The bromination mass is then poured into 1500 parts of water. By adding sodium bisulfite the exceeding bromine is removed and then the 5:7-dibromo-8-hydroxy-quinaldine thus precipitated is filtered off and thoroughly washed. In this manner 158 parts of the raw product are obtained which may be purified by recrystallisation from alcohol and then forms slightly colored crystals having the melting point of 125°-126° C.

Example 3

68 parts of 5-chloro-8-hydroxy-quinaldine (made from 4-chloro-2-aminophenol and croton aldehyde, M. P. 67°-68° C.) are dissolved in 350 parts of 85% formic acid. 100 parts of bromine are allowed to slowly drop into this solution at 0° to —10° C., until a test taken therefrom shows no more coupling reaction. The reaction mass is introduced into 700 parts of water and the bromine in excess removed by means of a sodium bisulfite solution. The reaction product thus precipitated is filtered off and thoroughly washed with water. For purification purposes the dry raw product may be recrystallised from hot butyl alcohol. Thus the 5-chloro-7-bromo-8-hydroxy-quinaldine is obtained in form of almost colorless needles which melt at 113°-114° C.

What I claim is:

1. The halogen substitution products of 8-hydroxy-quinaldine containing the halogen in the carbocyclic nucleus of the general formula

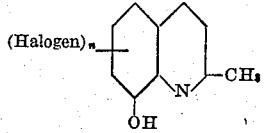

$n$ being 1 and 2, being slightly yellowish crystal powders of excellent antiseptical properties.

2. The 5:7-dichloro-8-hydroxy-quinaldine of the formula

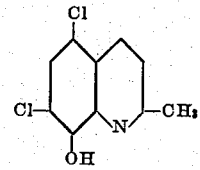

being slightly yellowish crystal needles of the melting point of 111.5°-112° C.

3. The 5:7-dibromo-8-hydroxy-quinaldine of the formula
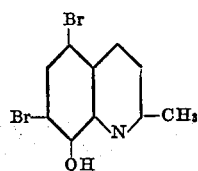
being slightly colored crystals of the melting point of 125°–126° C.
4. The 5 - chloro - 7 - bromo-8-hydroxy-quinaldine of the formula
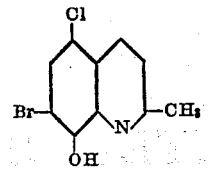
being almost colorless needles of the melting point of 113°–114° C.
EMIL SENN.